Feb. 19, 1957  B. VER NOOY  2,782,370
PIPE LINE INSTRUMENT
Filed Aug. 6, 1953  2 Sheets-Sheet 1

Burton Ver Nooy
INVENTOR.
BY Browning & Simms
ATTORNEYS

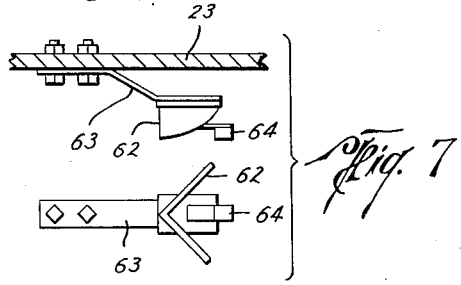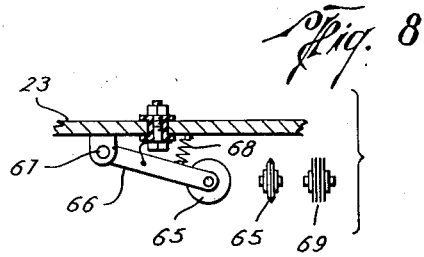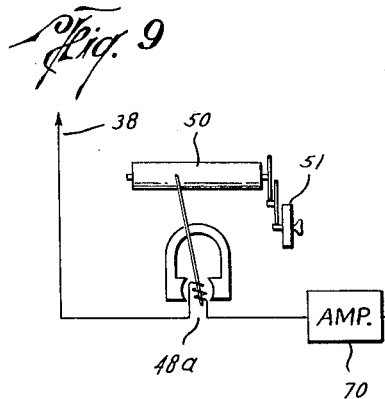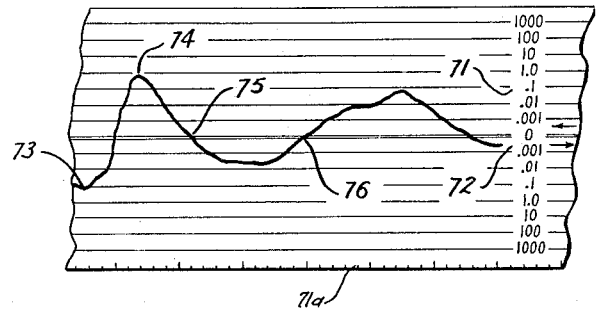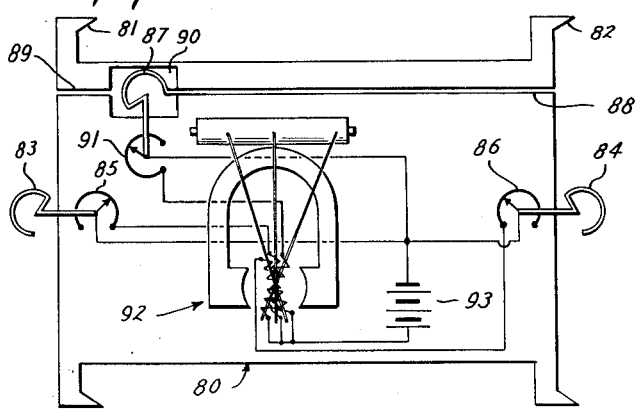

United States Patent Office 2,782,370
Patented Feb. 19, 1957

2,782,370

PIPE LINE INSTRUMENT

Burton Ver Nooy, Tulsa, Okla., assignor to T. D. Williamson, Inc., Tulsa, Okla., a corporation of Oklahoma Application August 6, 1953, Serial No. 372,755

19 Claims. (Cl. 324—72)

This invention relates to an apparatus and method for measuring a condition in or of a pipe line, particularly after the pipe line has been installed. In another of its aspects, this invention relates to an apparatus useful in detecting and measuring normal current flow in a pipe line for the purpose of analyzing or determining corrosion conditions as they may exist around the pipe line while the same is buried in the earth.

Pipe lines for conducting fluids, such as crude oil, petroleum products, natural gas, water, et cetera, are in common use throughout this country and many other parts of the world. In the usual pipe line installation, the pipe is buried beneath the earth's surface and, in some instances, passes under rivers or other bodies of water so that the pipe is not readily accessible for the measurement of conditions existing inside or around it. Oftentimes it would be highly desirable to possess a record of a certain condition as the same existed from point to point along a pipe line. For example, it would be advantageous to possess a means for recording pressure variations along a length of pipe line so that areas of excessive pressure drop could be determined and steps taken to remedy the same. Of perhaps even greater importance, a record of corrosion conditions as they exist along the pipe line would be very useful in analyzing steps to be taken to more fully protect the pipe line from corrosive influences.

With regard to such corrosion, it is well known that electric currents flow from point to point along a pipe line and that the intensity and direction of flow of these currents are valuable indicia of the corrosion tendencies of the pipe line. Such current flows are generated by a difference in potential existing between the earth and the pipe line due to chemical differences between the metal of the pipe and the constituents of the earth and by many other causes such as stray currents from electric railroads, adjacent power lines, or any other source of electrical potential. Flow of such currents out of and into the pipe line from the surrounding earth are indicative of the existence of corrosion, and the relative amount of current per unit area of pipe line surface is a measure of the intensity of corrosion.

Most buried pipe lines are provided with an external coating of pipe line enamel or the like covered over with a suitable wrapping material which together provide an insulation against current flow from the pipe line to the earth or vice versa. Despite the precautionary steps taken today to test such coating for "holidays" before the pipe line is covered, it may happen that undetected holidays exist and that additional holidays develop, as when the pipe is being lowered into the ditch and covered or by certain processes developing after the pipe line has been buried. Such holidays ordinarily are each quite small in area and accordingly provide a path for concentrated current flow between the pipe line and the surrounding earth. Since the currents are relatively concentrated on the small area of the pipe, their corrosive effect is likewise concentrated so that rapid corrosion will exist at these holidays if steps are not taken to prevent the same.

One form of such protection which has enjoyed considerable popularity is cathodic protection wherein a protecting metal, such as magnesium, is employed to negative the corrosive effect of the electric potentials on the metal of the pipe line. In the past, the application of cathodic protection has been on a "rule of thumb" basis rather than upon any intelligent estimate of the extent of protection required. As a result, some portions of the pipe line are overprotected which may result in excessive corrosion developing in other portions of the pipe line.

Further, since the direction and magnitude of currents flowing in the pipe line have in the past been largely unknown, an intelligent approach to combating corrosion is difficult if not impossible. For these and other reasons, it would be highly desirable to possess an apparatus and method for measuring the magnitude and direction of normal current flow from point to point along a pipe line to thereby produce a continuous record of current conditions along the pipe line. Such a record can be used, for example, not only to evaluate the necessity for protection but the effectiveness of the same after it has been applied.

In the past, attempts have been made to measure the current flow along the pipe line by driving contact rods into the earth until electrical contact was made with the pipe line. The installation of these rods has necessarily resulted in a disturbance of the earth around the pipe line and hence of the corrosive influences in the immediate area of the rod so that a true picture of pipe line corrosion conditions as they existed prior to driving the rods has not been obtained. Additionally, it is manifestly impossible to space the rods closely enough to each other that anything approaching a continuous record of current flow in the pipe line can be obtained.

Accordingly, it is a general object of this invention to provide apparatus which can be passed through a pipe line to measure a condition in or of the pipe line in such a manner that the intelligence thus derived can be readily correlated with the length of the pipe line so such condition as it exists from point to point along the pipe line can be determined.

Another object of this invention is to provide a method of recording variations in a condition as they exist along the length of a pipe line wherein such variations are correlated with the distance they occur along the pipe line merely by controlling the pumping rate of fluid into the pipe line.

Another object of this invention is to provide such a method and apparatus which is capable of being employed without installing any additional equipment on a pipe line other than that normally used in pipe line operation, without necessarily disturbing the pipe line after it has been buried in the earth and without any substantial interruption of the normal use of the pipe line.

Another object of this invention is to provide apparatus for detecting current flow normally occurring in a pipe line which current flow is an indicia of corrosive or noncorrosive conditions, the apparatus being readily usable after the pipe line has been buried in the earth without necessarily uncovering the pipe line and without any substantial interruption in its normal operation.

Another object of this invention is to provide a method for recording a condition in or of a pipe line while the same is in service and without any substantial disturbance of the same so that such condition is substantially unaffected by the measuring operation thereby assuring obtaining an accurate operating record of the condition as it exists in actual operation of the pipe line.

Another object of this invention is to provide an apparatus adapted to be propelled through a pipe line by fluid being pumped through the line, the apparatus including a towing and a towed member each carrying contact means and constructed in such a manner that the towed member automatically remains a predetermined distance from the towing member so that normal current flow along the pipe line between said contact means can be accurately measured to provide an analysis of corrosion conditions existing in and around the pipe line while it is in actual use.

Another object of this invention is to provide such an apparatus having spaced apart contact means wherein the contact means can be spaced any desired distance apart and yet the apparatus can traverse bends in the pipe line without hanging up in the same.

Another object of this invention is to provide such a current measuring apparatus having a towing member providing a substantially imperforate piston within and movable along the pipe line by fluid being pumped through the line so that movement of the apparatus through the pipe line is a function of the pumping rate of fluid into the pipe line thereby providing a readily controlled rate of movement of the apparatus.

Other objects, advantages and features of this invention will be readily apparent to one skilled in the art upon the consideration of the written specification, the appended claims, and the attached drawings wherein:

Figs. 5, 6, 7 and 8 illustrate alternative contact means which may be substituted for those shown in Fig. 1;

Fig. 9 is a schematic diagram of a circuit adapted to be employed in the apparatus of Fig. 1;

Fig. 10 is an illustrative reproduction of a record which may be obtained by the apparatus of Fig. 1, such record showing the direction and magnitude of current flow at various points along a pipe line; and Fig. 11 somewhat schematically illustrates an embodiment of a pipe line instrument which is useful in practicing the method of this invention in taking a pressure traverse of a pipe line.

Like characters of reference are used throughout the several views to designate like parts.

Figure 1:
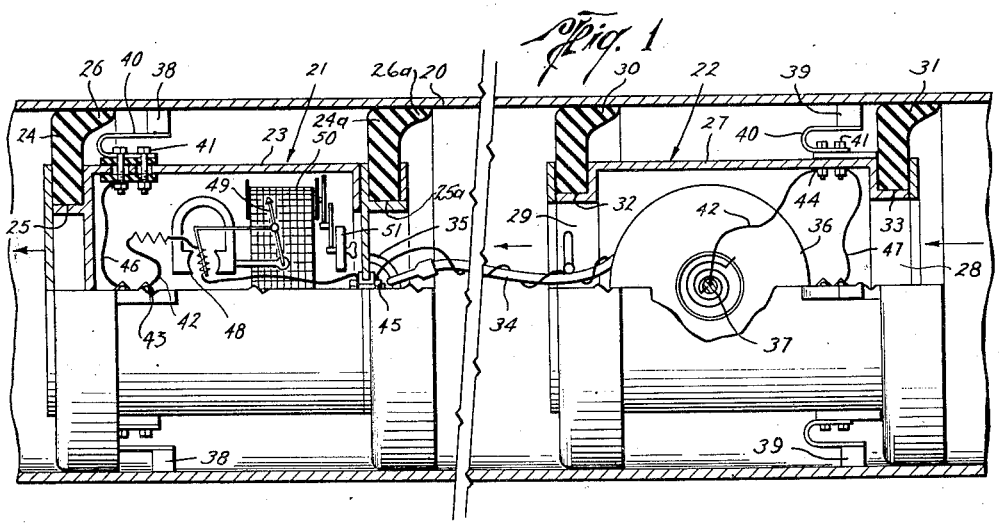
Fig. 1 illustrates one embodiment of the apparatus of this invention which is useful in practicing the method thereof, the apparatus being illustrated in place in a pipe line for measuring the magnitude and direction of current flow in the pipe line.

In accordance with this invention, there is provided a body means movable through a pipe line, preferably by fluid pumped through the pipe line. This body means can include an arrangement of peripheral seals thereabout such that the body means acts as a piston-like member preventing or substantially limiting fluid flow across the member. As a result, the velocity of the body means through the pipe line is a function of the velocity of fluid flowing through the pipe line. Thus, for example, if the body were used in a pipe line into which oil was being pumped, the body would move through the pipe line at substantially the same velocity as the oil and hence the rate of movement of the body can be readily controlled by controlling the pumping rate. Ordinarily, pumping stations are provided with suitable means for controlling and regulating the pumping rate so that control of the velocity of the body means presents no serious problem nor one requiring the installation of additional equipment under usual circumstances.

Carried by the body means is a suitable measuring means for sensing a condition in or of the pipe line and providing an output varying with variations in the condition. The output is picked up by a suitable recorder, preferably also carried by the body means, which includes a recording medium. This recording medium is moved by a drive mechanism at a predetermined rate past an indicia impressing means controlled by the measuring means. Then by suitably adjusting the pumping rate relative to the rate of movement of the recording medium, the impression made on the recording medium is correlated with the distance traveled by the body and measuring means. For example, in the oil pipe line illustration set forth above, if the recording medium is moved a given number of inches per hour and the oil pumping rate necessary to move the oil through the pipe line at a given number of feet per hour is known, then the pumping rate can be set to move the instrument a predetermined number of feet per inch of travel of the recording medium. With such control of the oil pumping rate, the location of the body means along the pipe line for any given point on the recording medium can be readily determined. In a preferred embodiment, the recording medium is calibrated in feet of pipe line traversed by the instrument for a predetermined pumping rate so that upon actuation of the drive mechanism for the recording medium and maintaining the predetermined pumping rate, a record is automatically made showing the status of a condition in or of the pipe line along the length thereof and the condition at any point along the line can be easily read from the record.

In the current measuring apparatus of this invention, a body means similar to that described above can be employed as a towing member and is connected to a towed member so as to maintain a predetermined distance between them. Each of the members carries a contact means for electrically connecting a measuring apparatus connected between the contact means to spaced apart points on the pipe line. With this construction, it is possible to measure both the magnitude and direction of normal current flow along the pipe line and to provide a continuous record of the same. In a preferred form, the towing and towed members are connected by a suitable flexible force transmitting member, such as a cable, thereby permitting the towing and towed members to be spaced a considerable distance apart and yet to traverse bends in the pipe line.

Referring now to the drawings, there is illustrated a section of pipe line 20 having a body means which can comprise, in a preferred form, a towing member 21 and a towed member 22. Towing member 21 is preferably piston-like in construction and forms a sliding seal with the inside walls of the pipe line so that fluid on the rear side of the member is substantially prevented from flowing past the member to the other side. Thus there is provided a sealed housing 23 spaced from the walls of the pipe line by means of peripheral seal and support members 24 and 24a. These support members are retained on housing 23 by bolts (not shown) extending across annular channels 25 and 25a formed on the housing or in any other suitable manner. Seals 24 and 24a are shown in Fig. 1 to have an outwardly flexible lip 26 and 26a, respectively, so that fluid pressure behind the towing member urges the lips into sealing engagement with the inner walls of the pipe line and yet such lips can flex inwardly to ride over projections into the pipe line. With this construction, it will be apparent that by applying a fluid pressure behind the towing member greater than that in front thereof, the towing member will be moved along the pipe line at a velocity which is a function of fluid velocity through the line. When the housing and seals provide a substantially imperforate radial section across the pipe line, the towing member will move through the line at a rate which is substantially equal to the rate of flow of fluid through the line. With liquids, the velocity of the towing member will be almost exactly equal to that of the liquid flowing through the line.

The towed member 22 likewise includes a housing 27 which can be similar to housing 23 except that preferably it is not sealed and a fluid passageway is provided from one end of the housing to the other. Thus, housing 27 is annular in form providing an opening 28 at its rear and an opening 29 at its forward end permitting fluid to flow through the housing. Housing 27 is preferably provided with a support means which can take the form of seals 30 and 31 although this is merely a matter of convenience since an efficient seal with the pipe line is not necessary in this preferred form. Seals 30 and 31 can likewise be bolted in channels 32 and 33, respectively. In this manner, the housing 27 is supported from the interior walls of the pipe line and the resilient seals 30 and 31 provide an insulating means for insulating housing 27 from mechanical shocks and the like and yet permit the housing to traverse out-of-round sections of pipe line and the like.

Means are provided interconnecting the bodies to maintain them a substantially constant distance apart. In a preferred form, this means comprises a cable 34 or other laterally flexible force transmitting element connected at one of its ends to a ring 35 carried by housing 23 and at its other end to a cable reel 36 mounted upon an axle 37 in housing 27. The cable reel can be spring loaded to turn the reel in a direction to wind the cable thereon so that when towing member 21 is lodged in a scraper trap or otherwise removed from the path of fluid flow in the pipe line, the intervening cable between the towing and towed members is wound on the cable reel thereby permitting the towed member to also become lodged in the scraper trap. One means of performing this function is to size the flow passage through the housing 27, as by regulating the size one or both of openings 28 and 29, so that when the towing member 21 is in the pipe line and is being propelled along by fluid, any fluid which might leak past towing member is insufficient to cause any substantial pressure drop across the towed member. In such operation, the towed member must rely upon its force transmitting connection with the towing member to be moved along the line. However, the flow passage is sufficiently restricted that when the towing member becomes lodged in a scraper trap and the towed member's velocity is thereby reduced, continued flow of fluid through the pipe line causes sufficient pressure drop across the towed member that it likewise is pushed into the scraper trap. During such pushing, the spring of the cable reel winds up the cable so that it will not become entangled between the towing and towed members. The spring driving the cable reel is sufficiently weak that it will not normally pull the towed member towards the towing member while both are in the pipe line but is strong enough to reel up the cable when the towed member is being propelled into the scraper trap. It is contemplated that the cable reel can be motor actuated and a suitable tripping means or actuating means provided on the towing member to energize the motor upon stoppage of the towing member in the scraper trap.

Contact means are provided on each of the towing and towed members to substantially continuously electrically contact the inside walls of the pipe line. Such contact means can comprise a plurality of contact parts 38 on the towing member and a plurality of contact parts 39 on the towed member. Means are provided for continuously urging these contact parts radially outwardly of the respective housings 23 and 27 so that despite wear of the contact parts or variations in contour of the pipe line, the contact parts will be continuously in contact with the pipe line. Such means can comprise a U-shaped spring 40 as shown in Fig. 1 which is bolted by means of bolts 41 to the respective housings. A current transmitting connection is provided between the contact means and this can take the form of a conductor wire 42 extending between one of the contact means on the towing member, as at 43, to one of the contact means on the towed member, as at 44. This wire extends along cable 34 and can be made an integral part of the cable in a manner well known to those skilled in the art. Thus, the wire from point 44 passes along axle 37 and along cable 34 through an electrically insulated connector 45 in housing 23 to point 43. It will be noted that the plurality of contact means on the respective towing and towed members are connected in series as by wires 46 and 47.

Means are provided in the current transmitting connection between the contact means for measuring the amount and direction of current flow normally occurring in the pipe line between the spaced apart contact points afforded by contact parts 38 and 39. Such means can comprise a simple recording voltmeter or ammeter, millivoltmeter or milliammeter. In Figs. 1 and 9, it is contemplated that other instruments capable of effecting this function can be substituted.

As illustrated in Fig. 1, millivoltmeter 48 is connected in conductor 42 and drives a suitable stylus or other indicia impressing means 49. It will be apparent that with this construction the position of stylus 49 with respect to recording medium 50, will be dependent not only upon the magnitude of current flow along the pipe line between parts 38 and 39 but also its direction. Then by providing a drive mechanism 51 adapted to move the recording medium past stylus 49 at a substantially constant rate and one which is a function of the velocity of the towing member in the pipe line, it is apparent that the position of the towing member along the pipe line will be automatically correlated on the recording medium with the record of the magnitude and direction of current flow being made at that particular point.

In operation then, the towing and towed members are inserted in the pipe line after drive mechanism 51 has been started to move recording medium 50. Then by pumping fluid into the pipe line at a predetermined rate, the towed member and the towing member will be moved along the pipe line at a velocity which is a function of the pumping rate. As the towing and towed members move through the pipe line, contact parts 38 and 39 will continuously contact the inner wall of the pipe line thereby permitting measuring means 48 to make a continuous record of normal current flowing along the pipe line between spaced apart points 38 and 39. The towing and towed members are maintained at a substantially constant distance apart by cable 34 so that an accurate record can be made. Should the apparatus need to traverse a bend in the pipe line, the flexibility of cable 34 permits this to be done. When the apparatus reaches the scraper trap, the towing member passes into the same thereby permitting the fluid passing through the pipe line to push the towed member into the trap while the cable reel winds up the cable. The apparatus can then be removed from the trap in a normal manner and the chart recovered for interpretation.

Figure 2:
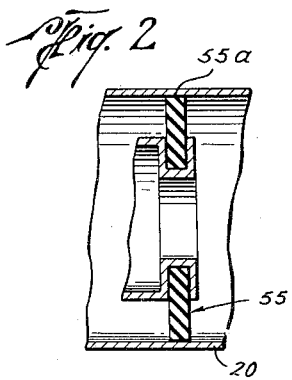
Figs. 2, 3 and 4 illustrate alternative seals or supports which may be substituted for those illustrated in Fig. 1.
Figure 3:
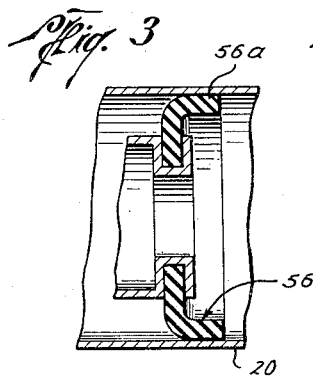
Figure 4:
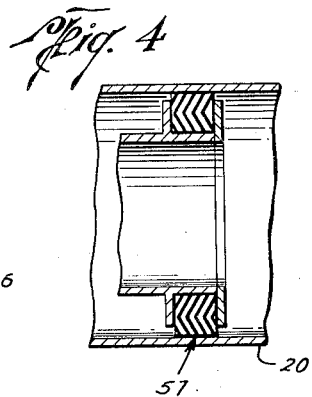

Referring to Figs. 2 through 4, there are shown various alternative types of sealing means and supporting means adapted to be used in place of the lip type seals 24 and 24a. They also can replace the support members 30 and 31 if desired. In Fig. 2, the lip type seal 55 is an annulus of rubber having an outer circumferential edge 55a adapted to form a sliding seal with the inside of the pipe line. In Fig. 3, the seal 56 is similar to seal 24 except that there is provided a backturned flange 56a instead of the sealing lip 26. The backturned flange will, with sufficient pressure differential across the same, also act as a sealing lip. In Fig. 4, a chevron type packing 57 is illustrated.

Figure 5:
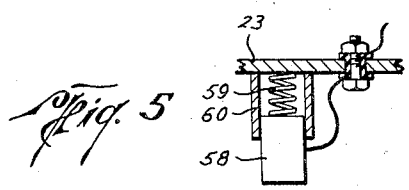
Figure 6:
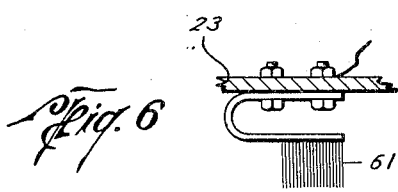

Referring to Figs. 5 through 8, various alternate types of contact means are illustrated. In Fig. 5, contact parts 58 can be of carbon, metal or other conductor and is biased outwardly by a spring 59 and guided to its outward position by a housing 60 carried by housing 23. In Fig. 6, a brush 61 having a plurality of stiff metal bristles has been substituted for the contact parts 38 and 39 of Fig. 1 and this type of brush is particularly preferred where the inside of the pipe line is coated with some sort of insulating material such as paraffin or the like. Also, the brush finds particular use where the inside of the pipe line has become coated with rust or other flaky material which the brush can readily remove. A similar functional arrangement is shown in Fig. 7 where a V-shaped scraper 62 is provided in the form of a plow mounted upon a leaf spring 63 so that coatings on the inside of the pipe, particularly paraffin, can be removed as the towing and towed members move along the pipe line thereby permitting a contact part 64 to make electrical contact wtih the pipe line. It will be obvious from Fig. 7 that the plow 62 should pass along the pipe line ahead of contact part 64 in order to clear a path for the latter. Referring to Fig. 8, there is illustrated a roller 65 rotatively mounted upon an arm 66 pivoted to housing 23 at 67 and urged outwardly by a spring 68. Where the inside of the pipe line is such that the roller can make electrical contact with the pipe itself, the arrangement of Fig. 8 is particularly preferred where long stretches of pipe line are to be traversed inasmuch as wear on the roller will often be less than on the arrangements of Figs. 1, 5, 6 and 7. In place of the single roller 65, a plurality of thin rollers 69 can be substituted to provide a plurality of contacts with the inside of the pipe line thereby assuring a more uniform and continuous pick-up.

Referring to Fig. 9, there is illustrated schematically a wiring diagram which might be substituted for that of Fig. 1 particularly where the magnitude of the currents in the pipe line is extremely small. In this circuit, the contact means 38 and 39 are provided as in Fig. 1 and a measuring means 48a is provided in a manner similar to instrument 48 in Fig. 1. Recording medium 50 is driven by a drive mechanism 51 similar to that shown in Fig. 1. In addition to the circuit Fig. 1, there is provided an amplifier 70 in the circuit between points 38 and 39 in order that the current flowing instrument to 48a is amplified to provide a more accurate reading. It should be noted that the amplifier does not impress any potential between the points 38 and 39 nor is any needed. The same is true of the circuit in Fig. 1 where it is desired to measure the normal current flowing in the pipe line and to do this it is not necessary to impress any artificial potential between the points 38 and 39.

Referring now to Fig. 10, there has been reproduced a simulation of a chart of the type which can be made by the apparatus illustrated in Fig. 1. It will be noted that a plurality of horizontal lines 71 are provided on the chart and these lines may be numbered with indicia indicating the extent or magnitude of current flow between the points 38 and 39. With the arrangement of Fig. 1, points above the zero line 72 indicate current flow in one direction and points below the zero line indicate current flow in the other direction. The chart can be marked off as at 71a with feet of pipe line traversed. In interpreting the chart, it will be noted that the current curve is relatively steep at between points 73 and 74 and further that the change in magnitude from the minimum at 73 to the maximum at 74 is relatively great. This indicates that severe corrosion can be expected at the point where the curve crosses the zero line. Also, if the pipe line is coated, this may indicate a fault or holiday in the coating. At point 75, the record line crosses the zero line in a direction to indicate that considerable current is entering the pipe line at such point. Such a situation would indicate that the pipe line should be investigated for a source of stray current. At point 76, it will be noted that the record line has a smaller crossing angle across the zero line and less maximum current on either side thereby indicating that the corrosion at 76 is less severe than at the zero point between 73 and 74. Where there are extended areas of the decreasing current to the zero line, there is an indication of corrosion possibilities such as areas of poor coating on coated lines.

As indicated in Fig. 1, the recording medium can be a paper chart and stylus 49 can be an inking pen. However, it is contemplated that the recording medium can be a photographic film and illustrated stylus substituted with a beam of light directed on the film from a suitable light source and controlled by the measuring means 48, such as a mirror controlled by the measuring means to reflect a beam of light onto the film. Further, it is contemplated that the measuring means can be constructed to control frequency or audio modulation or the output can be recorded on a wire or tape and later translated to readable form, a manner well known to those skilled in the art. Also, it is possible to entirely remove the recording means from the apparatus and situate it externally of the pipe line by providing a suitable transmission system between the measuring means and recording means such as a wire to the end of the pipe line or, when this is not feasible, by radio wave broadcast to the outside where it can be picked up and a suitable record made.

Referring now to Fig. 11, there is illustrated a body means similar to that shown for the towing member in Fig. 1. Thus, it comprises a sealed housing 80 having peripheral seals 81 and 82 adapted to form a sliding seal with the inside of the pipe line so that the body means can be pumped through the pipe line. Suitable pressure gauge pickups 83 and 84 are provided on either side of housing 80 and these can comprise Bourdon tubes or other pressure sensitive means set to actuate rheostats 85 and 86. There can also be provided a third pickup 87 in the form of a Bourdon tube whose interior is exposed to the pressure rearwardly of the housing through a passage 88 and whose exterior is exposed to the pressure forwardly of the housing through a passage 89 and a chamber 90. Pickup 87 likewise actuates a rheostat 91. Provided in the housing is a multiple channel recorder 92 of a construction well known to those skilled in the art. Each of the channels of this recorder are connected to one of the rheostats 85, 86 and 91 and to a battery 93 in a manner well known to those skilled in the art. With this arrangement, the instrument can be passed through the pipe line to record the pressure in front and behind the instrument and the pressure differential across the instrument. The latter serves as a check on front and rear pickups. The results can be used to analyze the fluid flow characteristics of a pipe line because such characteristics are a function of pipe size and pressures. Since the pipe size is known, the measurement of the pressure will permit the analysis to be made.

It is contemplated that the pressure sensitive instrumentation shown in Fig. 11, as well as in the other figures, can be substituted by other instruments such as temperature measuring instruments, pipe line position indicators, and the like, or that two or more instruments can be installed in housing 23 of Fig. 1 or housing 80 of Fig. 11 along with the instrument shown therein. In this manner a plurality of records can be made upon the same or different charts within the housing.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for measuring current flow in a pipe line which comprises, in combination, body means adapted to be inserted in a pipe line and moved longitudinally therethrough, separate longitudinally spaced apart contact means carried by the body means to continuously electrically contact the inner wall of the pipe line as the body means moves therethrough; a circuit connecting said contact means to each other and including therein a current sensing and measuring means carried by said body means, said sensing and measuring means being sensitive to both direction and amount of current flow normally occurring in the pipe line between said contact means and providing an output continuously reflecting said direction and amount, and recording means operatively associated with said sensing and measuring means and, in operation, recording said output and providing a record of variations in both said direction and amount of current flow as such variations occur along the pipe line.

2. An apparatus for measuring current flow in a pipe line which comprises, in combination, body means adapted to be inserted in the pipe line and moved longitudinally therethrough, separate longitudinally spaced apart contact means carried by the body means to electrically contact the inner wall of the pipe line as the body means moves therethrough, a current transmitting connection between said contact means to thereby provide a circuit between longitudinally spaced apart points along the pipe line, means in said circuit for measuring the amount and direction of current flow normally occurring in the pipe line between said points, and recording means carried by said body and operatively associated with said measuring means and recording variation in the output thereof to provide a record of both said amount and direction as they exist along the pipe line.

3. The apparatus of claim 2 wherein said body means includes a piston means insertable in the pipe line to form therein a movable barrier to fluid flow so that the body means can be moved through the pipe line by fluid being pumped therethrough.

4. An apparatus for measuring current flow in a pipe line which comprises, in combination, a first body element having a peripheral sealing means adapted to contact the inside of a pipe line to thereby form a movable barrier to fluid flow past the first body element so that the same can be moved along the pipe line by fluid pumped therethrough, a separate second body element, a force transmitting connection between the first and second body elements to maintain them a predetermined distance apart in the pipe line, first and second contact means respectively carried by said first and second body elements to electrically contact the inside of the pipe line at longitudinally spaced apart points as said first and second body elements move through the pipe line, a current transmitting connection between the contact means to thereby provide a circuit between said points, means in said circuit for measuring the amount and direction of current flow normally occurring in the pipe line between said points, and recording means operatively associated with said measuring means to record the output thereof.

5. The apparatus of claim 4 wherein said first body element is imperforate to fluid flow therepast in the pipe line so that the velocity of the first body element is substantially that of the fluid in the pipe line.

6. The apparatus of claim 5 wherein the connection between said first and second body elements is laterally flexible, the second body element having a fluid passage permitting endwise fluid flow through the second body element.

7. An apparatus for measuring current flow in a pipe line which comprises, in combination, a towing member comprising a first housing, a resilient peripheral seal mounted on said first housing and adapted to sealingly engage the inner wall of the pipe line, said first housing with said seal providing upon insertion in the pipe line an effective piston movable through the pipe line responsive to fluid flow therethrough; a towed member comprising a second housing including a laterally extending member which is adapted to support the second housing within the pipe line, said towed member providing a longitudinal fluid passageway from one of its ends to the other to permit fluid flow therepast upon insertion of the towed member in the pipe line; a cable connecting the towing and towed members so as to maintain them a substantially constant distance apart; first and second contact means respectively carried by the towing and towed members to electrically contact the inside of the pipe line at longitudinally spaced apart points; a current transmitting connection between said contact means to thereby provide a circuit between said points; means in said circuit for measuring the amount and direction of current flow normally occurring in the pipe line between said points; and recording means operatively connected to said measuring means to record the output thereof.

8. The apparatus of claim 7 in combination with means carried by one of said towing and towed members for decreasing the length of cable between such members.

9. The apparatus of claim 7 wherein said contact means comprise electrical contact parts carried by each of said towing and towed members for substantially radial movement toward and away from the respective housings thereof, and resilient means biasing said contact parts outwardly of said housings so as to effectively maintain electrical contact with the inside of the pipe line despite variations in the latter's internal contour.

10. The apparatus of claim 7 wherein a means for impressing intelligence on a recording medium is provided, said recording means being carried by one of said towing and towed members and including a drive mechanism for moving said recording medium at a constant rate of speed relative to said impressing means, said impressing means being controlled by said measuring means to vary the impression on the recording medium responsive to the amount and direction of normal current flow in said pipe line.

11. An apparatus for measuring current flow in a pipe line which comprises, in combination, a piston-like imperforate towing member having a peripheral sealing means adapted to contact the inside of the pipe line to form thereby a movable piston substantially preventing liquid flow past the towing member so that the same is propelled through the pipe line at the same velocity as liquid passing through the pipe line; a towed member; a force transmitting connection between the towing and towed members maintaining them a substantially constant distance apart in operation; first and second contact means respectively carried by the towing and towed members to continuously contact the inside of the pipe line at longitudinally spaced apart points; a bi-directional current transmitting connection between the contact means to thereby provide a circuit between said points permitting current flow in either direction therebetween; means in said circuit for measuring the amount and direction of current flow normally occurring in the pipe line between said points; and recording means operatively associated with said measuring means to record the output thereof.

12. The apparatus of claim 11 wherein said towing and towed members each comprise a housing, the towed member housing having a longitudinal liquid transmitting passage therethrough, resilient means extending outwardly from the towed member housing to position the latter internally of the pipe line and to cushion the same against mechanical shocks, said force transmitting means comprising a cable.

13. An instrument for measuring and recording a condition in or of a pipe line which comprises, in combination, an independent sealed housing, a peripheral sealing means carried by the housing spacing the latter from the inside surface of the pipe line and, with the housing providing a fluid barrier extending transversely across the pipe line and limiting flow of fluid past the housing so that the velocity of the housing through the pipe line will be a function of the velocity of fluid flow through the pipe line, means carried by the housing to sense a condition as it normally exists along the pipe line, means carried by the housing and operatively connected to the sensing means to measure the output of the sensing means, and means carried by the housing and operatively associated with the measuring means to record the output of the measuring means.

14. The instrument of claim 13 wherein said housing and sealing means provide an imperforate barrier across the pipe line so that fluid passing through the pipe line will move the housing at substantially the same velocity as the flow velocity of the fluid, and wherein said recording means is carried by the housing and includes a recording medium moved at a constant rate of speed relative to an indicia impressing means controlled by the measuring means so that the rate of movement of the recording medium is proportional to the velocity of the housing through the pipe line.

15. A method for recording a condition in or of a pipe line which comprises the steps of inserting a substantially imperforate piston in the pipe line, said piston carrying a sensing and measuring means for detecting and measuring said condition, pumping fluid into said pipe line behind said piston at a predetermined rate whereby the velocity of the piston through the pipe line is proportional to the pumping rate, causing said sensing and measuring means to sense and measure said condition as it exists along the pipe line and as the piston is propelled through the pipe line, recording the output of said measuring means on a recording medium, and moving said recording medium past means for forming a record thereon at a rate proportional to the pumping rate.

16. A method for recording a condition in or of a pipe line which comprises the steps of inserting a substantially imperforate piston in the pipe line, said piston carrying a sensing and measuring means for detecting and measuring said condition, pumping fluid into said pipe line at a predetermined constant rate whereby the velocity of the piston through the pipe line is constant and proportional to the pumping rate, recording the output of said measuring means on a recording medium, and moving said recording medium past means for forming a record thereon at a constant rate so that for any given distance along the pipe line traversed by the piston, the recording medium will have moved a proportional distance.

17. A method for measuring a condition as it exists along a pipe line which comprises the steps of inserting a piston means in said pipe line, said piston means substantially obstructing flow therepast through the pipe line and carrying a sensing and measuring means for detecting and measuring said condition, pumping a predetermined quantity of fluid into said pipe line per unit of time to move the piston means through the pipe line at a determinable velocity proportional to the pumping rate, causing said sensing and measuring means to sense and measure said condition as the piston means moves through the pipe line and determining the output of said sensing and measuring means as a function of movement of said piston means through said pipe line.

18. An apparatus for measuring a condition as it exists along a pipe line which comprises a towing member insertable in the pipe line to provide a substantial restriction to flow therepast whereby flow of fluid through the pipe line propels the towing member therealong, a towed member also insertable in the pipe line and providing a restriction to flow therepast which is less than that past the towing member, a flexible connection between the towed and towing members permitting the towing member to pull the towed member along curved and otherwise irregular lengths of the pipe line, and means carried by the towing and towed members for measuring a condition of the pipe line as it exists between longitudinally spaced points therealong one of which is proximate the towing member and the other proximate the towed member.

19. An apparatus for measuring and recording a condition as it exists along a pipe line disposed generally horizontally so that aparatus cannot be passed therethrough solely by the action of gravity which comprises, in combination, an integral self-contained independent body means insertable into the pipe line and having a peripheral portion fitting closely in the pipe line to substantially restrict flow in the pipe line past the body means whereby the body means is propelled through the pipe line solely by pumping fluid therethrough, means carried by the body means to sense the condition to be measured, recording means carried by the housing and operatively connected to the sensing means to record the output of the sensing means and including a driving means for moving a recording medium at a rate proportional to the velocity of the body means through the pipe line.

References Cited in the file of this patent

UNITED STATES PATENTS

| | | |
|---|---|---|
| 2,338,991 | Arnold | Jan. 11, 1944 |
| 2,371,658 | Stewart | Mar. 20, 1945 |
| 2,601,249 | Brenholdt | June 24, 1952 |